No. 719,967. PATENTED FEB. 3, 1903.
J. F. WILLIAMS.
ICE SHAVER.
APPLICATION FILED AUG. 28, 1902.
NO MODEL. 2 SHEETS—SHEET 1.
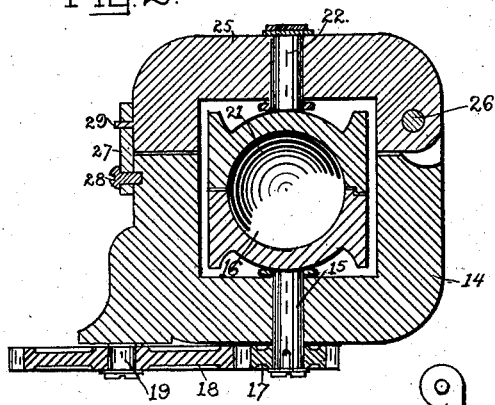
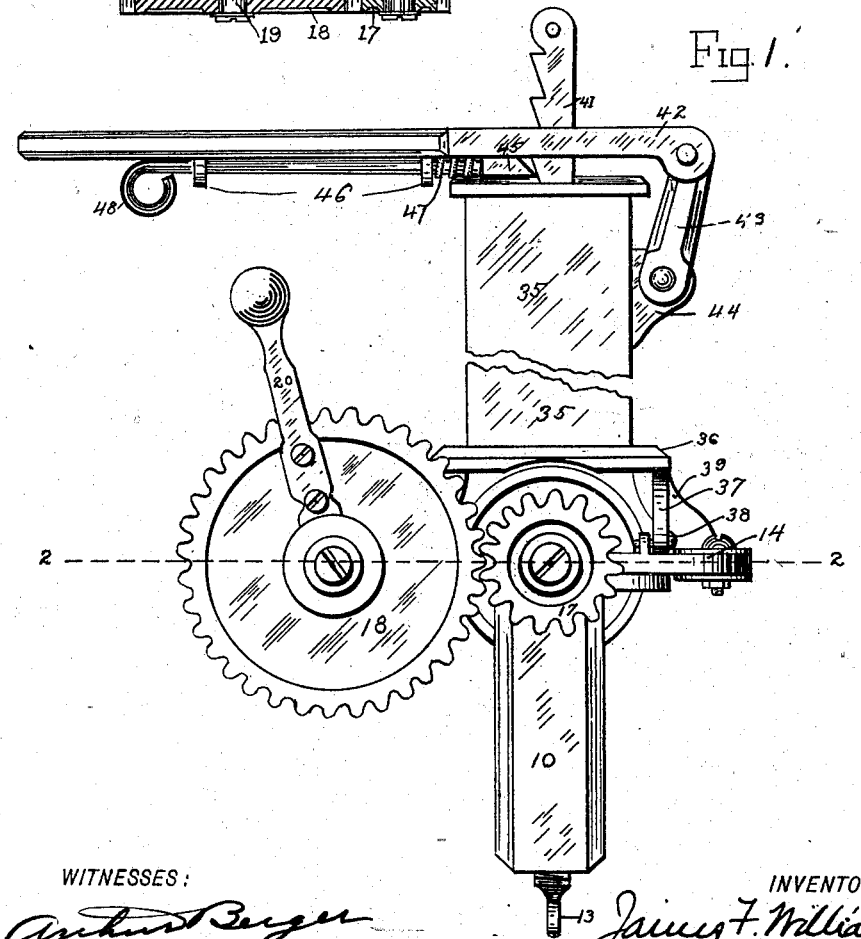
WITNESSES: INVENTOR
James F. Williams
BY
ATTORNEY No. 719,967. PATENTED FEB. 3, 1903.
J. F. WILLIAMS.
ICE SHAVER.
APPLICATION FILED AUG. 28, 1902.
NO MODEL. 2 SHEETS—SHEET 2.
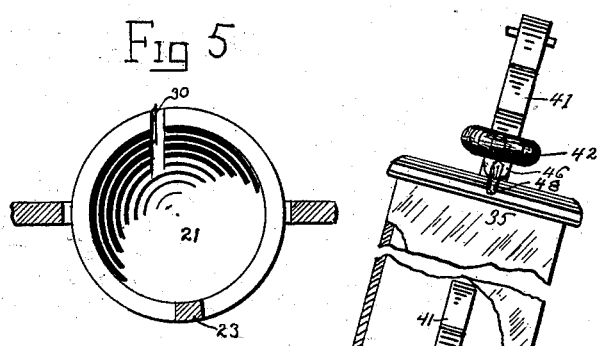
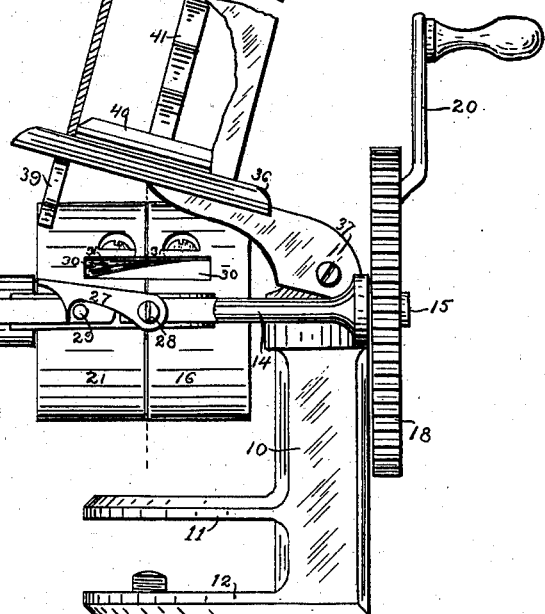
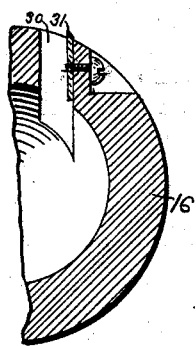
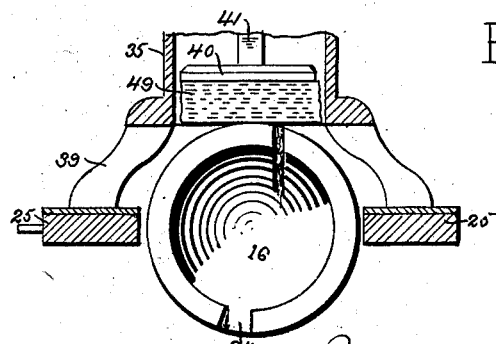
WITNESSES: INVENTOR
James F. Williams
BY
V. H. Lockwood
ATTORNEY

UNITED STATES PATENT OFFICE.

JAMES F. WILLIAMS, OF VINCENNES, INDIANA, ASSIGNOR OF TWO-THIRDS TO FRANCIS SCHENKER, OF VINCENNES, INDIANA.

ICE-SHAVER.

SPECIFICATION forming part of Letters Patent No. 719,967, dated February 3, 1903.

Application filed August 28, 1902. Serial No. 121,397. (No model.)

*To all whom it may concern:*

Be it known that I, JAMES F. WILLIAMS, of Vincennes, county of Knox, and State of Indiana, have invented a certain new and useful Ice-Shaver; and I do hereby declare that the following is a full, clear, and exact description thereof, reference being had to the accompanying drawings, in which like figures refer to like parts.

The object of this invention is to form and compress ice as it is being shaved into a desired form.

The nature of this invention will be understood from the accompanying drawings and the following description and claims.

In the drawings, Figure 1 is a side elevation of the device with the ice-chest broken away in the middle. Fig. 2 is a horizontal cross-section on the line 2 2 of Fig. 1. Fig. 3 is a front elevation of the device with the ice-chest tipped somewhat and partly in vertical section and also centrally broken away. Fig. 4 is a central vertical section from front to rear through a part of the machine on a line between the halves of the ice-shavings vessel. Fig. 5 shows the half of the vessel not shown in Fig. 4. Fig. 6 is a detail of the knife-mounting.

In detail the drawings show a frame 10 with two arms 11 and 12 and a clamping-screw 13 for securing it to a table. The frame has a horizontal top or head 14, in which a shaft 15 is mounted. To such shaft the half 16 of the ice-shavings vessel is secured. The shaft 15 is actuated by the pinion 17 thereon and the gear 18 on the spindle 19 and the crank 20 on said gear.

The ice-shavings vessel is formed of the half 16 and a corresponding half 21, mounted on the spindle 22. The two halves register with each other and interlock by the lug 23 on the half 21, fitting in the recess 24 in the half 16 when brought together by the bar 25. It is pivoted at 26 to the top 14 of the frame 10 and is held in closed position by latch 27, pivoted at 28 and engaging catch 29. When brought together, as seen in Figs. 2 and 3, the halves 16 and 21 make a closed vessel to receive ice-shavings, and it is rotated by shaft 15. A slot 30 extends through the two halves of the vessel, as seen in Fig. 3, through which the ice-shavings pass as shaved by the knives 31, secured in and at one side of each slot. The slots and knives in the two halves register, so as to operate as one slot and one knife.

The ice before shaving is in the chest 35, that is mounted above the ice-shavings vessel on the base 36. The base 36 is provided with the arms 37, which are pivoted to the top 14 of the pivots 38 on the frame 10. The ice-chest is provided with the legs 39, which rest on the bar 25, which is the normal position. The ice is placed in the chest 35 from the bottom when in a reclining position. From thence it is moved into a vertical or normal position. It is fed to the shaving-knife by gravity and also the pusher 40 on the notched bar 41, extending through the top of the chest, and forced down by the lever 42, fulcrumed to the link 43, that is pivoted to the bracket 44. The lever has a pawl 45 to engage the teeth on the bar 41, and said bar is slidably mounted in the eyes 46. It is held in engagement by spring 47 and withdrawn by the finger-piece 48.

49 is a block of ice. The mass of ice-shavings is removed from the vessel by releasing latch 27 and throwing the ice-chest 35 back. Not only will the ice-shavings be pressed in the vessel by the pressure of incoming ice due to shaving, but gravity will aid the machine.

The interior of the vessel here shown is spherical to make snow-balls; but it may have any other desired design.

What I claim as my invention, and desire to secure by Letters Patent, is—

1. In an ice-shaver, a cylindrical closed vessel to receive the ice-shavings which is formed of two parts that permit the contents to be removed without breaking the mass, said vessel having a longitudinal slot in it, a knife in the side of said slot for shaving the ice, means for rotating the vessel, and means for holding the ice adjacent said vessel.

2. In an ice-shaver, a cylindrical closed vessel to receive the ice-shavings which is formed of two halves, each half having a slot in it that registers with the slot in the other half, a knife in the side of the slot thus formed for shaving the ice, means for rotating the vessel, and means for holding ice adjacent the vessel.

3. In an ice-shaver, a vessel formed of two interlocking halves, means connected with one half for rotating it, means for mounting the other half so it can be separated from its companion half, a slot in said vessel, and a knife at said slot for shaving the ice.

4. In an ice-shaver, a vessel formed of two interlocking halves, means connected with one half for rotating it, means for mounting the other half so it can be separated from its companion half, a slot in each half, the two slots registering with each other, and a knife at each slot for shaving the ice.

5. In an ice-shaver, a frame, a rotary shaft therein, a vessel for the shavings formed of two halves, one half secured to said shaft, a rotatable spindle to which the other half is secured, a bar pivoted to the frame and carrying said spindle, a latch for securing said bar in place, a slot in said vessel and a knife at said slot for shaving the ice.

In witness whereof I have hereunto affixed my signature in the presence of the witnesses herein named.

JAMES F. WILLIAMS.

Witnesses:
N. E. BECKES,
HENRY S. CAUTHORN, Jr.